United States Patent [19]
Matsui

[11] Patent Number: 5,874,718
[45] Date of Patent: Feb. 23, 1999

[54] INFORMATION RECORDING MEDIUM

[75] Inventor: Shinzo Matsui, Yamanashi-ken, Japan

[73] Assignee: Olympus Optical Co., Ltd., Tokyo, Japan

[21] Appl. No.: 730,845

[22] Filed: Oct. 17, 1996

[30] Foreign Application Priority Data

Oct. 23, 1995 [JP] Japan .................................. 7-274392

[51] Int. Cl.$^6$ .................................................. G06V 07/10
[52] U.S. Cl. .......................................... 235/494; 235/462
[58] Field of Search .................................. 235/441, 456, 235/494, 462, 472, 454, 455, 469

[56] References Cited

U.S. PATENT DOCUMENTS

| | | | |
|---|---|---|---|
| 4,263,504 | 4/1981 | Thomas | 235/454 |
| 4,488,679 | 12/1984 | Bockholt et al. | 235/469 |
| 4,806,741 | 2/1989 | Robertson | 235/462 |
| 4,926,035 | 5/1990 | Fujisaka | 235/494 |
| 5,408,543 | 4/1995 | Yoshida | 235/494 |
| 5,410,620 | 4/1995 | Yoshida | 235/494 |
| 5,420,408 | 5/1995 | Weyrauch et al. | 235/454 |
| 5,541,396 | 7/1996 | Rentsch | 235/454 |
| 5,736,723 | 4/1998 | Clarke et al. | 235/456 |

FOREIGN PATENT DOCUMENTS 0 670 555 A1  9/1995  European Pat. Off. .

*Primary Examiner*—Thien Minh Le
*Attorney, Agent, or Firm*—Frishauf, Holtz, Goodman, Langer & Chick

[57] ABSTRACT

An information recording medium includes a dot pattern recorded thereon and optically readable, and the dot pattern is formed of a group of blocks arranged in matrix. Each of the blocks has both a data dot pattern constituted of a plurality of dots arranged in accordance with the content of data and a block address pattern representing an address of the block arranged in a predetermined position in relation to the data dot pattern. The dot pattern is formed such that the same blocks in predetermined areas of the block group are overlapped in the scanning direction.

35 Claims, 8 Drawing Sheets

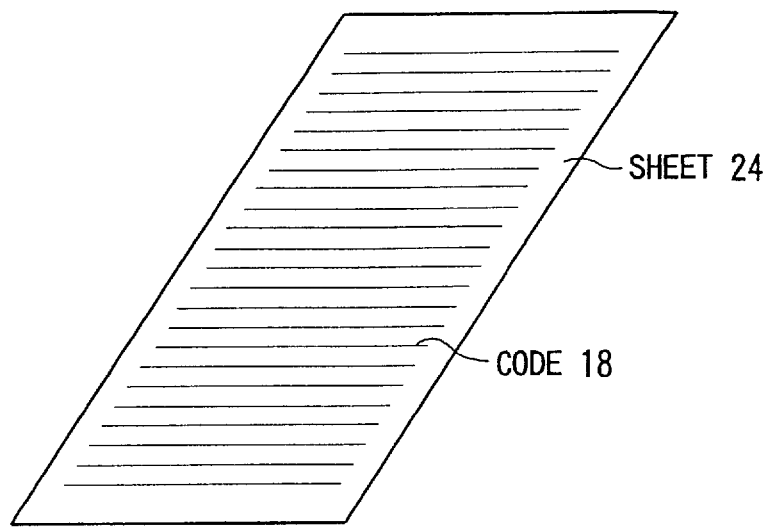
F I G. 5A
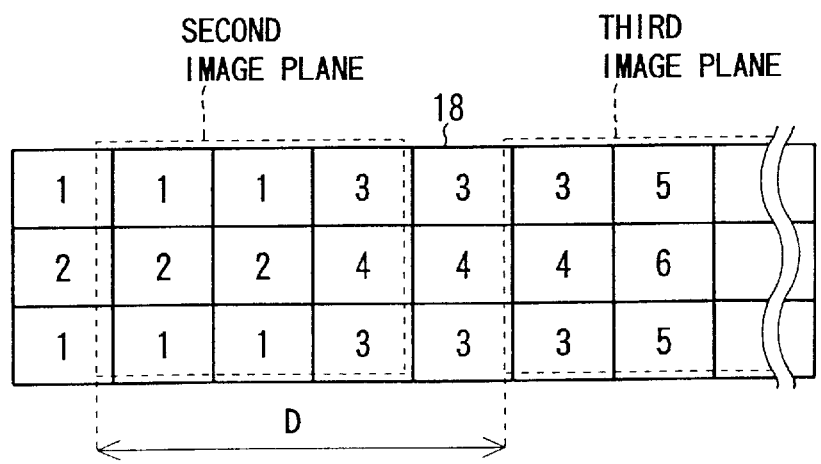
F I G. 5C

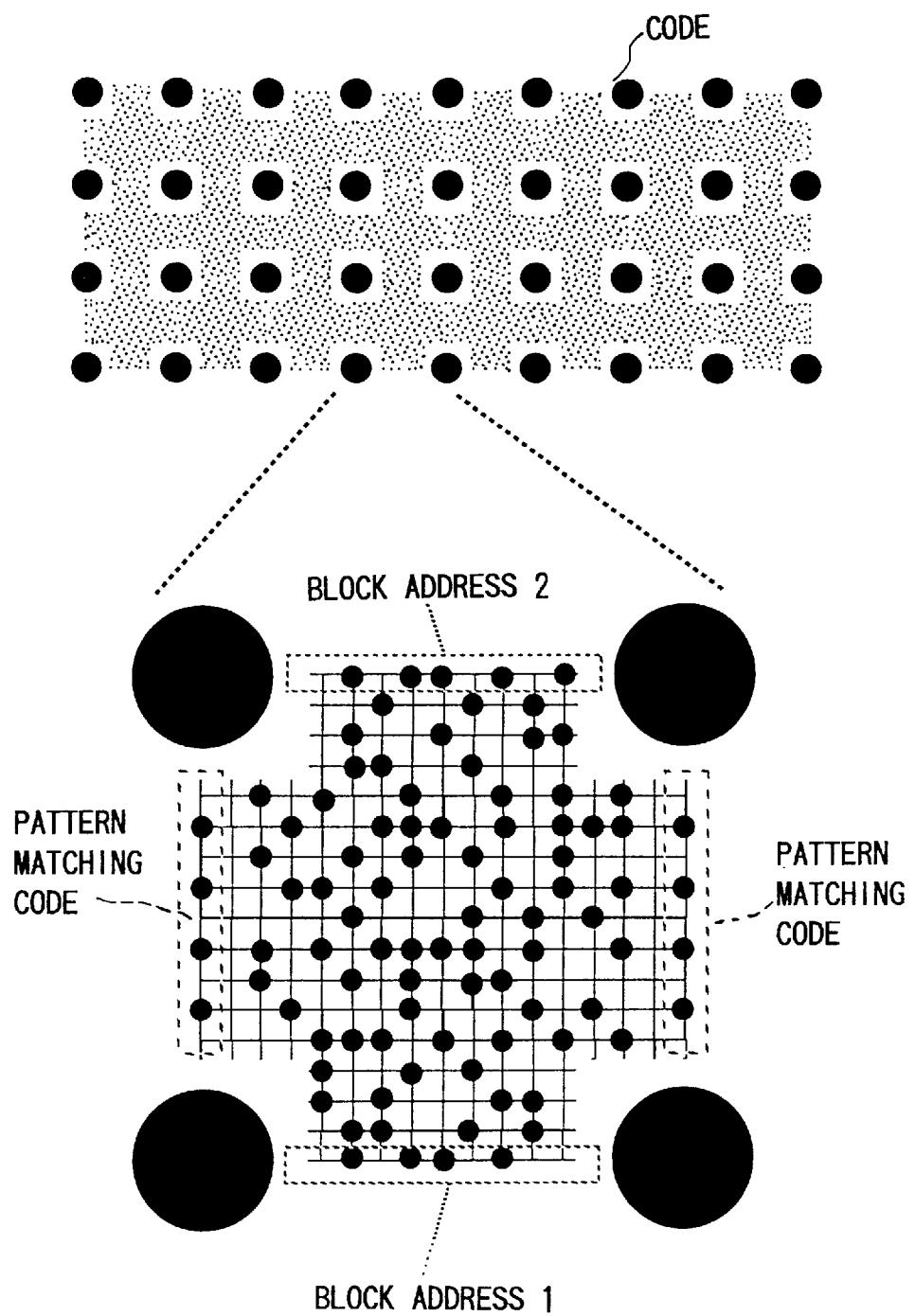
F I G. 5B

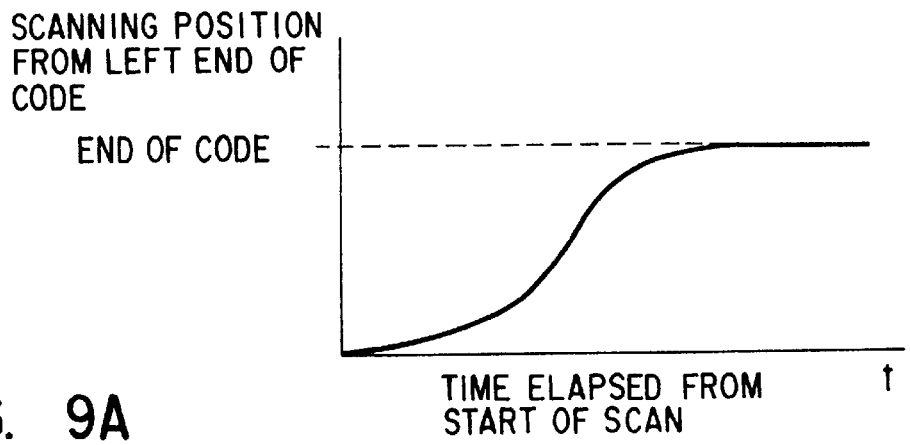
F I G. 9A
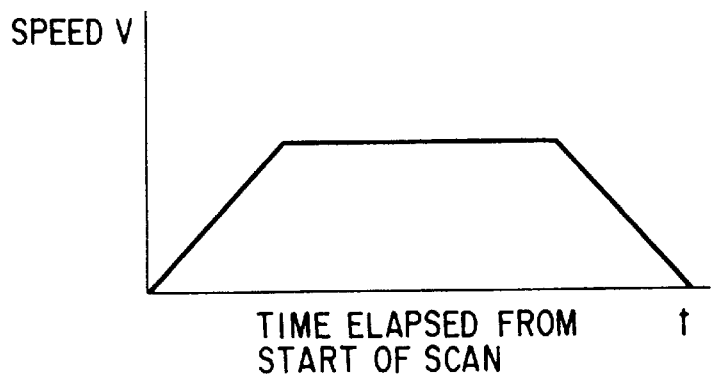
F I G. 9B
| 1 | 3 | 5 | 7 | 9 | 11 | 9 | 11 | 13 | 15 | 13 | 15 | 17 | 19 |
| --- | --- | --- | --- | --- | --- | --- | --- | --- | --- | --- | --- | --- | --- |
| 2 | 4 | 6 | 8 | 10 | 12 | 10 | 12 | 14 | 16 | 14 | 16 | 18 | 20 |
| 1 | 3 | 5 | 7 | 9 | 11 | 9 | 11 | 13 | 15 | 13 | 15 | 17 | 19 |
18
F I G. 10

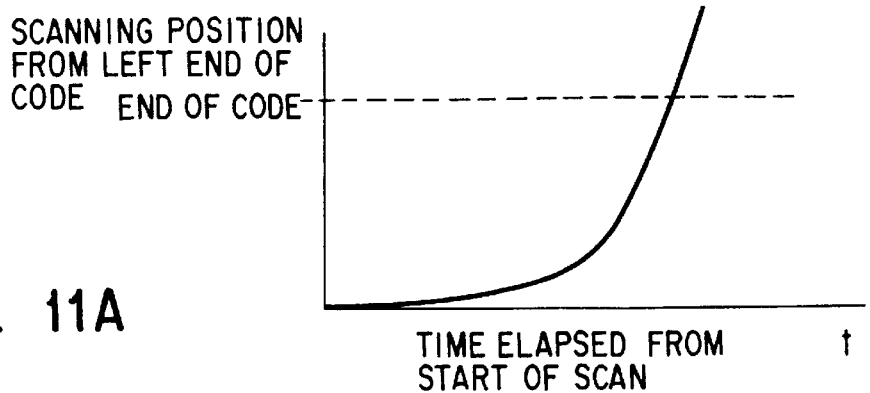
F I G. 11A
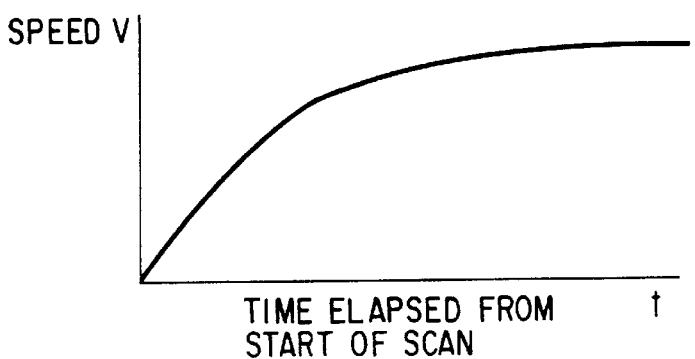
F I G. 11B
| 1 | 3 | 5 | 7 | 9 | 11 | 9 | 11 | 13 | 15 | 13 | 15 | 13 | 15 | 13 | 15 | 17 |
|---|---|---|---|---|----|---|----|----|----|----|----|----|----|----|----|----|
| 2 | 4 | 6 | 8 | 10 | 12 | 10 | 12 | 14 | 16 | 14 | 16 | 14 | 16 | 14 | 16 | 18 |
| 1 | 3 | 5 | 7 | 9 | 11 | 9 | 11 | 13 | 15 | 13 | 15 | 13 | 15 | 13 | 15 | 17 |
F I G. 12      ↘18
BLOCK ROW IN WHICH REGISTRATION
NUMBER IS RECORDED
                                                                18
| 1 | 2 | 1 | 2 | 1 | 2 | 3 | 4 | 3 | 4 | 3 | 4 | 5 | 6 |
|---|---|---|---|---|---|---|---|---|---|---|---|---|---|
| 7 | 8 | 9 | 10 | 11 | 12 | 13 | 14 | 15 | 16 | 17 | 18 | 19 | 20 |
| 1 | 2 | 1 | 2 | 1 | 2 | 3 | 4 | 3 | 4 | 3 | 4 | 5 | 6 |
MULTIMEDIA INFORMATION OTHR THAN REGISTRATION NUMBER
(AUTOGRAPH, NAME, DATE OF BIRTH, PHOTO OF FACE, VOICE, ETC.)
F I G. 13

INFORMATION RECORDING MEDIUM

BACKGROUND OF THE INVENTION

1. Field of the Invention

The present invention relates to an information recording medium such as paper on which multimedia information, including audio information such as speech and music, video information obtained from cameras and video apparatuses, and digital code data obtained from personal computers and word processors, is recorded as an optically readable code pattern.

2. Description of the Related Art

Various types of mediums, such as a magnetic tape and an optical disk, have been conventionally known as mediums for recording speech, music and the like. These mediums require a large space for keeping themselves and their unit costs are somewhat expensive, even though a great number of copies are made. To move a medium on which audio information is recorded to a person in a remote place takes a lot of time and labor whether it is mailed or handed. These problems are true of all the multimedia information including video information obtained from cameras and video apparatuses and digital code data obtained from personal computers and wordprocessors in addition to the audio information.

The team of engineers including the inventor of the present invention conceived a system for recording multimedia information including at least one of audio information, video information and digital code data, on an information recording medium such as paper in the form of a dot code as image information, i.e., coded information which can be facsimiled and copied in great numbers at low cost and for reproducing the multimedia information from the information recording medium, and filed an invention of the system as U.S. patent application Ser. No. 08/407,018.

The U.S. Patent Application discloses a group of blocks arranged in matrix. Each of the blocks has a data dot pattern formed of a plurality of dots arranged in accordance with data and a block address pattern indicating an address of the block and located in a predetermined position with respect to the data dot pattern.

More specifically, as shown in FIG. 1A, each block includes markers 10, arrangement direction detecting codes 12, a distinctive block address 14, and in-block recording data 16. The markers 10 are each recorded as a large round dot, and the recording data 16 is constituted of dots which are remarkably smaller than the markers 10.

Such blocks are arranged two-dimensionally to form a dot code, as illustrated in FIG. 1B. In this dot code, two blocks are arranged in a vertical direction, while N/2 blocks are done in a horizontal direction. Data is thus reproduced as one code from all the blocks arranged two-dimensionally. In FIG. 1B, the distinctive block address 14 is represented as blocks 1 to N. Each of the blocks has a block width BW in its vertical direction and a block length BL in its horizontal direction, and the width of two blocks corresponds to that of the dot code, called an effective code width CEW.

FIG. 1C simply shows the constitution of the dot code of FIG. 1B using the block address 14 only.

According to the system disclosed in the foregoing U.S. Patent Application, a dot code is optically read and reproduced from an information recording medium by manually moving an information reproduction apparatus to scan the dot code on the information recording medium.

For example, as shown in FIG. 2, a dot code 18 can be manually scanned in its longitudinal direction with the information reproduction apparatus such that a reading unit 20 of the apparatus vertically contacts the dot code 18, i.e., the face of the information recording medium. Since the dot code 18 includes the block address 14, it can be read even though the information reproduction apparatus is moved in any direction. In other words, information recorded as the dot code 18 can be reproduced by manually scanning the dot code 18 from one end to the other with the reading unit 20.

Since, as illustrated in FIG. 2, the reading unit 20 is provided with a scan position indicating mark 22 corresponding to the width of the dot code 18, an operator can correctly perform a manual operation for scanning the reading unit 20 while looking at the mark 22, that is, while paying attention to the width of the dot code 18.

As the information reproduction apparatus for reproducing the dot code 18, U.S. patent application Ser. No. 08/532,982, filed by the same inventor as that of the present invention, discloses a similar one having the constitution as shown in FIG. 3.

The information reproduction apparatus shown in FIG. 3 reads a dot code 18 recorded on a sheet (information recording medium) 24 by scanning a reading unit 20 having an image pickup unit 26 and processes an output signal of the image pickup unit 26 by a processing unit provided separately from the reading unit 20, thereby to reproduce the original multimedia information. It is needless to say that the processing unit can be incorporated into the reading unit 20. The processing unit includes an image unit block data reproduction unit 28, a block link unit 30, and a deinterleave and error correction unit 32. A plurality of images picked up by the image pickup unit 26 in accordance with the manual scanning, are processed by the image unit block data reproduction unit 28 to restore block data. The block data are rearranged by the block link unit 30 based on a block address added thereto for each block, and their errors are corrected by the deinterleave and error correction unit 32. The error-corrected data are output from an output unit 34 as multimedia information such as sound and image.

The image pickup unit 26 has a light for image pickup and is constituted so as to prevent light from being supplied externally. Since the unit 26 picks up an image in a short period of exposure time for every image pickup period of an image pickup element, a blur due to scanning is lessened.

In manual scanning, a scanning speed generally varies from operator to operator. One operator scans slowly, while another does quickly. In the slow scanning, the block link unit 30 processes the blocks whose images are picked up overlappingly and selects one from among the blocks in order to use data of the finally-obtained block or data with the least error when the blocks of the same address overlap one another. Thus, all the blocks are linked, and the original multimedia information is reproduced without any error.

On the contrary, in the quick scanning, some blocks are not imaged. If a number of blocks are not imaged, the original multimedia information cannot be correctly reproduced even though an error is corrected by the deinterleave and error correction unit 32.

The above manual scanning will be described by way of the dot code of blocks as shown in FIG. 4A. In this example, the width of an image pickup area 26A is three times or greater than the width BW of each of the blocks, and the length thereof is also three times or greater than the length BL of each block.

If the dot code is scanned by an information reproduction apparatus having the image pickup area 26A, the image pickup range is shifted as shown in FIG. 4B. In this figure, the solid line indicates the blocks of the dot code and the dotted line represents a one image pickup range. The blocks of block addresses 1 and 2 are imaged in the first image plane, those of addresses 3 to 6 are done in the second image plane, those of addresses 8 to 10 are done in the third image plane, and those of addresses 11, 12, . . . are done in the fourth image plane. If the blocks of all the addresses are imaged in this manner, the original multimedia information can be reproduced with reliability.

If, however, the scanning is performed at high speed, the blocks of addresses 1 and 2 are imaged in the first image plane and those of addresses 7 to 10 are done in the second image plane, but those of addresses 3 to 6 are not imaged, as shown in FIG. 4C. Thus, the original multimedia information cannot be reproduced.

SUMMARY OF THE INVENTION

The present invention has been developed in consideration of the above situation and its object is to provide an information recording medium capable of correctly reading and reproducing a dot pattern even though a reading unit is scanned at high speed.

According to the present invention, there is provided an information recording medium comprising:

a sheet-shaped medium; and a dot pattern recorded on at least one surface of the sheet-shaped medium and optically readable, the dot pattern including a block group having a plurality of blocks arranged in matrix, and each of the blocks having both a data dot pattern formed of a plurality of dots arranged in accordance with a content of data and a block address pattern arranged in a predetermined position in relation to the data dot pattern and representing an address of each of the blocks in the block group, wherein the dot pattern is formed of same blocks overlapped in a scanning direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5A is a perspective view showing the outward appearance of an information recording medium according to a first embodiment of the present invention;

FIG. 5B is a view illustrating a pattern of a dot code;

FIG. 5C is a view exemplifying the block arrangement of the dot code;

FIGS. 9A and 9B are graphs showing a relationship between the elapsed time for scanning the dot code and the scanning position of the dot code from its leftmost end, and a relationship between the elapsed time and the scanning speed, respectively;

FIG. 10 is a view exemplifying the block arrangement of a dot code used in an information recording medium according to a fifth embodiment of the present invention;

FIGS. 11A and 11B are graphs showing a relationship between the elapsed time for scanning the dot code, without paying any attention to the scanning, and the scanning position of the dot code from its leftmost end, and a relationship between the elapsed time and the scanning speed, respectively;

FIG. 12 is a view exemplifying the block arrangement of a dot code used in an information recording medium according to a sixth embodiment of the present invention; and FIG. 13 is a view exemplifying the block arrangement of a dot code used in an information recording medium according to a seventh embodiment of the present invention.

DETAILED DESCRIPTION OF THE PREFERRED EMBODIMENTS

An information recording medium according to a first embodiment of the present invention will now be described. In this medium, too, an information reproduction apparatus having an image pickup area 26A in a dot code of blocks is employed, as in the prior art case shown in FIG. 4A. The width of the area 26A (in a direction perpendicular to the scanning direction) is three times or more than the width BW of each block, while the length thereof (in the scanning direction) is also three times or greater than the length BL of each block.

Figures 4A, 4B, 4C, 4D:
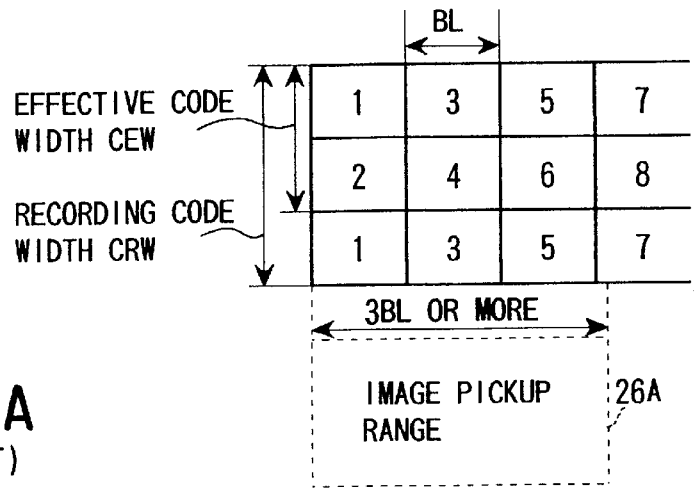
FIG. 4A is a view showing a relationship between the prior art block arrangement and the image pickup area of the information reproduction apparatus.
FIG. 4B is a view showing a shift in the prior art image pickup range.
FIG. 4C is a view showing a shift in the prior art image pickup range at the time of high-speed scanning.
FIG. 4D is a view showing an amount of shift in image pickup range in which direction a block can reliably be imaged.

As described above with respect to FIGS. 4B and 4C, the image pickup area 26A of the image pickup unit 26 is shifted in accordance with scanning, and a plurality of imaged blocks are restored. Information is reproduced if images of all blocks are picked up as shown in FIG. 4B, whereas it is not reproduced if there are a number of blocks which are not imaged as shown in FIG. 4C.

In the case of a CCD generally used in a video camera or the like, its image pickup unit picks up an image of one field for a period of 15 ms to 20 ms. The image is picked up using a shutter or light emitted from a light source for about 100 μs to prevent the image from being blurred. In other words, since an image is picked up every 15 ms to 20 ms, if the scanning speed is high, any blocks are not picked up and thus no information cannot be reproduced.

In the first embodiment, the width BW of one block is 2 mm and the length BL thereof is 2 mm, while the image pickup area 26A is 6 mm in length and 6 mm in width. A reading unit 20 having the image pickup area 26A is capable of reliably picking up one image of two blocks in length and two blocks in width. If the image pickup period T is set to 20 ms, the reading unit 20 moves for 20 ms during its scanning and needs to scan at a speed of not higher than 200 mm/s in a dot code constituted of blocks as shown in FIG. 4A. The maximum scanning speed V is calculated as follows.

A method for calculating the speed V necessitates satisfying the following two conditions when the reading unit 20 moves a distance D at the speed V for an image pickup period T.

1) In each pair of consecutive two image planes taken in by scanning, the address of a block imaged by one of the image planes and that of a block imaged by its subsequent image plane are arranged continuously without any omission.

2) The distance D is the maximum satisfying the above condition 1) even though the consecutive two image planes are taken in at any timing (in any positional relationship).

The maximum scanning speed V is given by:

$$V \approx D/T$$

In the dot code as shown in FIG. 4A, the maximum scanning speed V is calculated as follows since the distance $D \approx 2BL$ as shown in FIG. 4D.

$$V \approx 2 \times 2 \div 0.02 = 200 \text{ [mm/s]}$$

As is evident from the above, images of all blocks can be reliably picked up if the maximum scanning speed is about 200 mm/s. If, however, the speed exceeds 200 mm/s, some blocks cannot be imaged, and the original multimedia information cannot be reproduced with reliability.

Figure 1A:
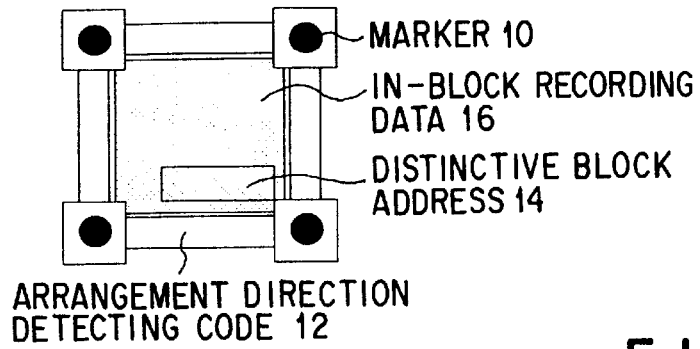
FIGS. 1A to 1C are views showing the constitution of a prior art block, that of a prior art dot code, and the arrangement of the prior art blocks, respectively.
Figure 1B:
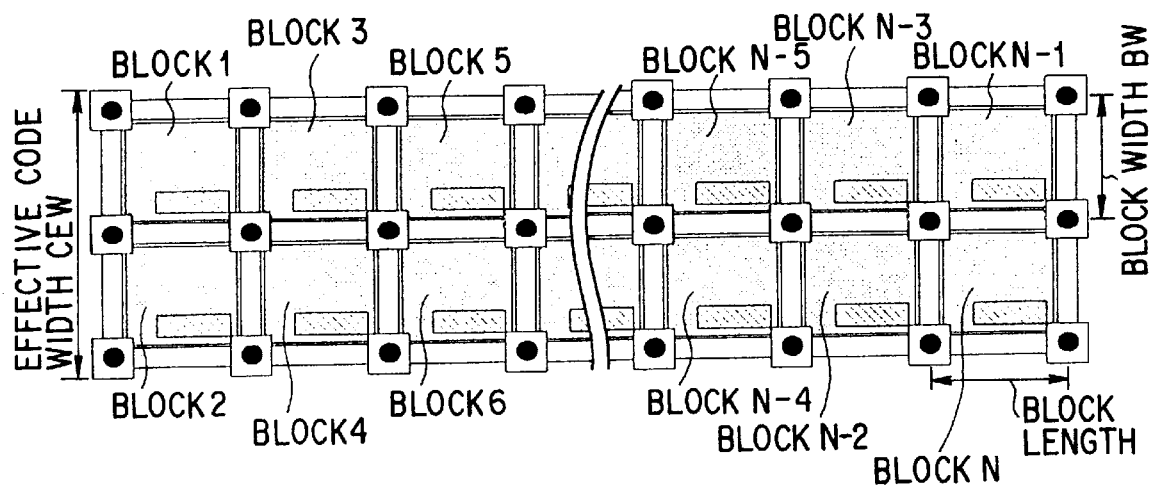
Figure 1C:
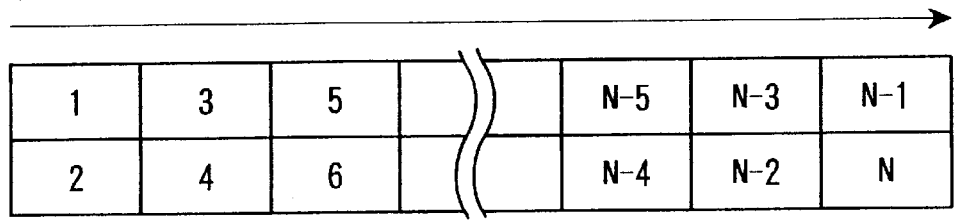
Figure 2:
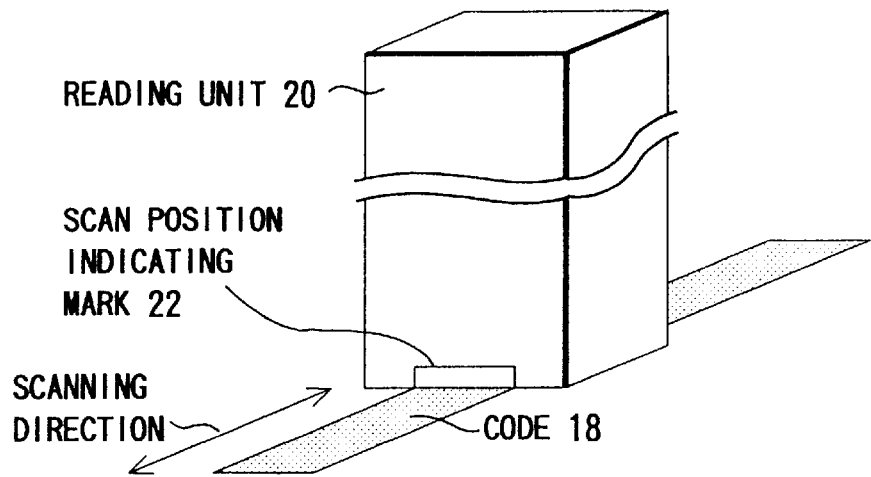
FIG. 2 is a view showing a scan position indicating mark of the prior art reading unit and a relationship between the dot code and reading unit.
Figure 3:
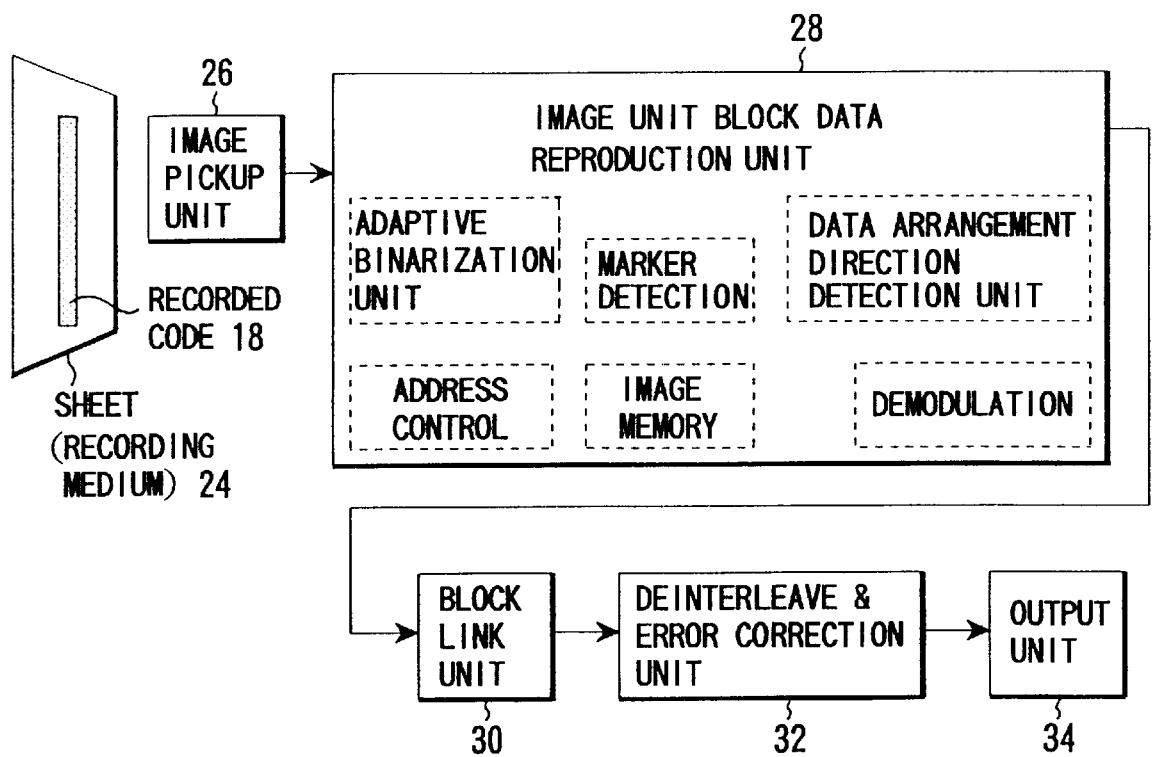
FIG. 3 is a block diagram of a prior art information reproduction apparatus.

To resolve the above problem, in the information recording medium of the first embodiment, a dot code 18 recorded on a sheet 24 as shown in FIGS. 5A and 5B and having the block arrangement as shown in FIG. 5C, is employed. Since the pattern of dot code shown in FIG. 5B has been described in U.S. patent application Ser. No. 08/542,220 whose applicant is the same as that of the present application, its description is omitted. None of the lines other than the dots and markers are actually recorded. Like FIG. 1C, FIG. 5C shows the arrangement of blocks each having an address. In block arrangement of the first embodiment, three blocks of the same address are recorded continuously in a scanning direction.

To calculate the maximum scanning speed V to scan the dot code shown in FIG. 5C, distance D by which the reading unit moves between the consecutive two image planes, is obtained as follows by satisfying the above conditions:

$$D \approx 4BL$$

The maximum scanning speed V is thus calculated as follows:

$$V \approx 4 \times 2 \div 0.02 = 400 \text{ [mm/s]}$$

When a dot code is scanned at a speed of 400 mm/s, there is a case where the images of two of the three continuous blocks are not picked up. Even in this case, according to the first embodiment, the blocks whose images are not picked up are not generated and thus the original multimedia information can reliably be reproduced, since the three blocks of the same address are arranged continuously.

Consequently, the allowable scanning speed is 200 mm/s or lower to scan the prior art dot code shown in FIG. 4A, whereas it is 400 mm/s or lower in the dot code of the first embodiment of the present invention. That is, the allowable scanning speed in the dot code of first embodiment is twice as high as that in the prior art dot code.

In the foregoing first embodiment, the same three blocks are recorded continuously in the scanning direction. However, the number of blocks is not limited to three and, when N blocks (N>2) are recorded continuously, a dot code including the N blocks can be scanned at a higher allowable scanning speed than the prior art dot code shown in FIG. 1C. The larger N, the higher the scanning speed. Even when images of consecutive (N−1) blocks of the N blocks are not picked up, images of all the blocks each having a necessary address can be picked up, and the original multimedia information can reliably be reproduced.

Figure 6A:
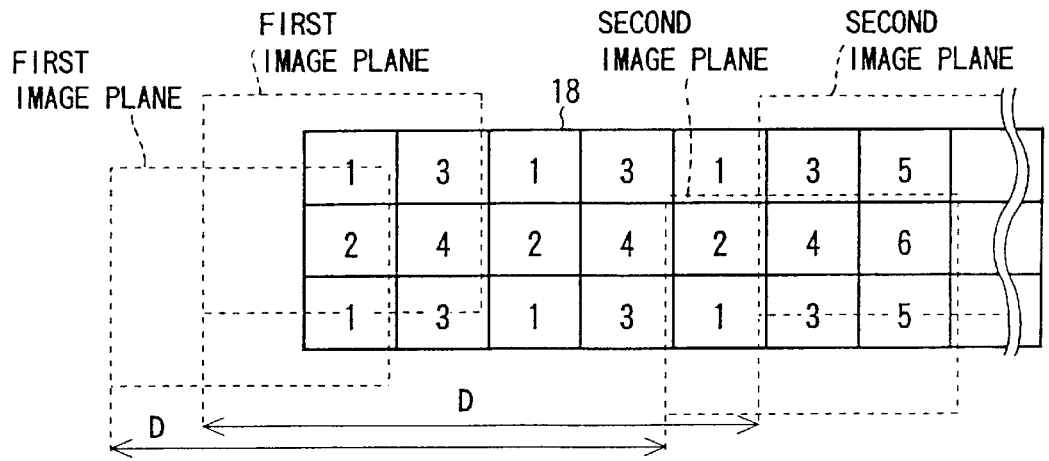
FIG. 6A is a view exemplifying the block arrangement of a dot code used in an information recording medium according to a second embodiment of the present invention.

An information recording medium according to a second embodiment of the present invention, which is intended to resolve the same problem of improving in scanning speed as that in the foregoing first embodiment, will now be described with reference to FIG. 6A. Like FIG. 1C, FIG. 6A shows the arrangement of blocks each having an address. In the block arrangement of the second embodiment, three pairs of adjacent two blocks having different addresses in every scanning direction, are recorded continuously.

To calculate the maximum scanning speed V to scan the dot code shown in FIG. 6A, distance D by which the reading unit moves between the consecutive two image planes, is obtained as follows by satisfying the above conditions:

$$D \approx 6BL$$

The maximum scanning speed V is thus calculated as follows:

$$V \approx 6 \times 2 \div 0.02 = 600 \text{ [mm/s]}$$

When the dot code is scanned at a speed of 600 mm/s or lower, the images of all blocks having necessary addresses can be picked up and thus the original multimedia information can reliably be reproduced.

Consequently, the allowable scanning speed is 200 mm/s or lower to scan the prior art dot code shown in FIG. 4A, whereas it is as high as 600 mm/s or lower to scan the dot code of the second embodiment of the present invention. That is, the allowable scanning speed in the dot code of second embodiment is three times as high as that in the prior art dot code.

The dot code of the second embodiment, shown in FIG. 6A, is identical in code length with that of the first embodiment, shown in FIG. 5C. However, in the second embodiment, the two blocks whose images are reliably picked up within one image plane have different addresses, and the efficiency of data of the blocks whose images are picked at a time is increased, thus achieving a higher allowable scanning speed.

It is needless to say that the above-described information reproduction apparatus is not limited to one having an image pickup range corresponding to the length of three blocks such that images of two blocks can reliably be picked up.

Figure 6B:
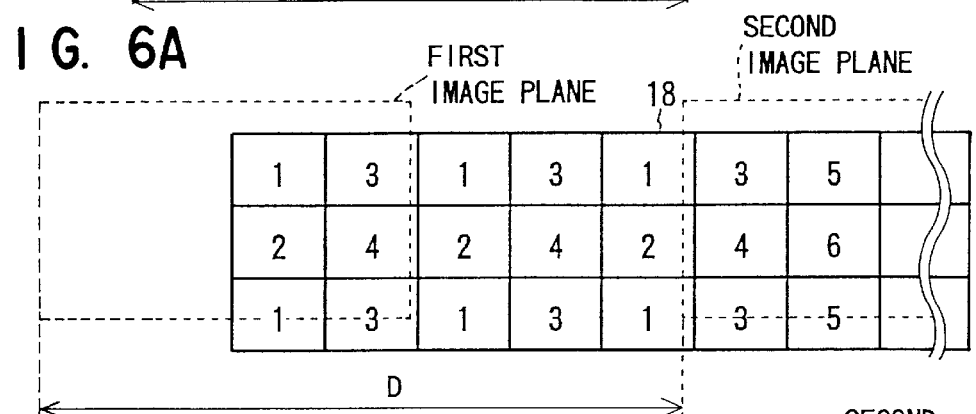
FIG. 6B is a view exemplifying another block arrangement of the dot code used in the information recording medium according to the second embodiment.

For example, FIG. 6B shows another example of the second embodiment shown in FIG. 6A. In this example, a dot code is scanned by an information reproduction apparatus having an image pickup range corresponding to the length of four blocks such that images of three blocks can reliably be picked up.

To calculate the maximum scanning speed V to scan the dot code shown in FIG. 6B, distance D by which the reading unit moves between the consecutive two image planes, is obtained as follows by satisfying the above conditions:

$$D \approx 7BL$$

The maximum scanning speed V is thus calculated as follows:

$$V \approx 7 \times 2 \div 0.02 = 700 \text{ [mm/s]}$$

The allowable scanning speed is 200 mm/s or lower to scan the prior art dot code shown in FIG. 4A, whereas it is as high as 700 mm/s or lower to scan the dot code of another example of the second embodiment shown in FIG. 6B. That is, the allowable scanning speed in the dot code of another example of the second embodiment is 3.5 times as high as that in the prior art dot code.

The dot code shown in FIG. 6B has the same block arrangement as that in FIG. 6A, in other words, three pairs of adjacent two blocks having different address in every scanning direction are recorded continuously; however, N ($\geq 2$) pairs of blocks can be recorded continuously.

Figure 7:
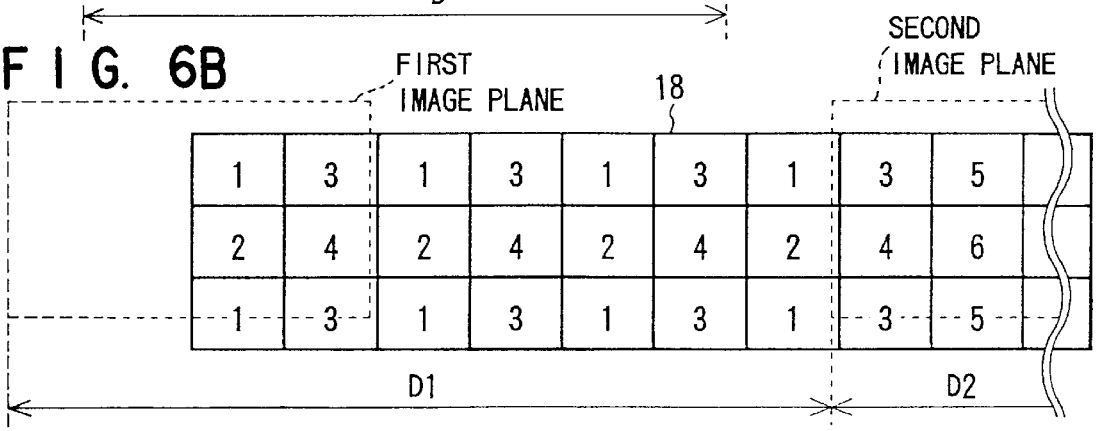
FIG. 7 is a view exemplifying the block arrangement of a dot code used in an information recording medium according to a third embodiment of the present invention.

A third embodiment of the present invention will now be described with reference to FIG. 7. In the block arrangement of the third embodiment, four pairs of adjacent two blocks having different addresses in every scanning direction, are recorded continuously.

To calculate the maximum scanning speed V to scan the dot code shown in FIG. 7 by the information reproduction apparatus having the image pickup size as described with reference to FIG. 6B, distance D by which the reading unit moves between the consecutive two image planes, is obtained as follows by satisfying the above conditions:

$$D \approx 8BL$$

The maximum scanning speed V is thus calculated as follows:

$$V \approx 8 \times 2 \div 0.02 = 800 \text{ [mm/s]}$$

When the dot code is scanned at a speed of 800 mm/s or lower, the images of all blocks having necessary addresses can be picked up and thus the original multimedia information can reliably be reproduced.

Consequently, the allowable scanning speed is 200 mm/s or lower to scan the prior art dot code shown in FIG. 4A, whereas it is as high as 800 mm/s or lower to scan the dot code of the third embodiment of the present invention. That is, the allowable scanning speed in the dot code of third embodiment is three times as high as that in the prior art dot code.

A fourth embodiment of the present invention will now be described with reference to FIG. 8.

In the block arrangement of the second embodiment shown in FIG. 6B, three pairs of adjacent two blocks having different addresses in every scanning direction are recorded continuously. According to the fourth embodiment, as shown in FIG. 8, two pairs of adjacent three blocks having different addresses in every scanning are recorded continuously. An information reproduction apparatus of the fourth embodiment has the same image pickup range, which corresponds to the length of four blocks such that images of three blocks can reliably be picked up, as that of the apparatus as shown in FIG. 6B.

To calculate the maximum scanning speed V to scan the dot code shown in FIG. 8, distance D by which the reading unit moves between the consecutive two image planes, is obtained as follows by satisfying the above conditions:

$$D \approx 6BL$$

The maximum scanning speed V is thus calculated as follows:

$$V \approx 6 \times 2 \div 0.02 = 600 \text{ [mm/s]}$$

Even when the dot code is scanned at a speed of 600 mm/s or lower, the images of all blocks having necessary addresses can be picked up and thus the original multimedia information can reliably be reproduced.

Consequently, the allowable scanning speed is 200 mm/s or lower to scan the prior art dot code shown in FIG. 4A, whereas it is as high as 600 mm/s or lower to scan the dot code of the fourth embodiment of the present invention. That is, the allowable scanning speed in the dot code of fourth embodiment is three times as high as that in the prior art dot code.

Figure 8:
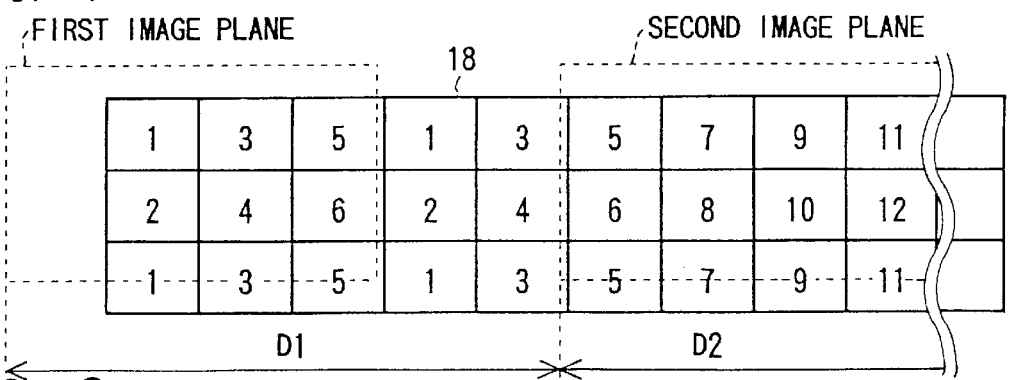
FIG. 8 is a view exemplifying the block arrangement of a dot code used in an information recording medium according to a fourth embodiment of the present invention.

In the block arrangement of the dot code shown in FIG. 8, two pairs of adjacent three blocks having different addresses in every scanning direction, are recorded continuously; however, one pair of N (N<M) blocks can be arranged when the dot code is scanned by an information reproduction apparatus, which includes an image pickup section having an image pickup range of one image plane capable of picking up images of at least [M−1] blocks in a scanning direction, in other words, having an image pickup range corresponding to the length of M blocks.

If the number (N) of blocks is larger on condition that M>N, N$\geq$2, and N is an integer, a higher scanning speed can be achieved.

More specifically, in an information recording medium from which information is reproduced by the information reproduction apparatus, which includes an image pickup section having an image pickup range of one image plane capable of picking up images of at least [M−1] blocks in a scanning direction, in other words, having an image pickup range corresponding to the length of M blocks, K pairs of adjacent N blocks having different addresses are recorded continuously in a scanning direction. If, in this information recording medium, the image pickup period at which one image is picked up is T and the length of one block (block size in the scanning direction) is BL, the maximum scanning speed V is expressed as follows.

$$V \approx \{(M-1) + N \times (K-1)\} \times BL \div T$$

where N$\geq$2, M>2, K$\geq$2, N<M, and N, M, K=integers.

Even though the information recording medium is scanned at the maximum scanning speed, information can reliably be reproduced therefrom. If the respective values of N, M and K are set larger, information can reliably be reproduced even at a higher scanning speed.

The first to fourth embodiments can be summarized as follows. If an information recording medium, from which information is reproduced by an information reproduction apparatus, which includes an image pickup section having an image pickup range capable of picking up images of at least [M−1] blocks (M=integer>1) in a scanning direction, for reproducing information by the picked-up images, is characterized in that K pairs (K=integer≧2) of adjacent N blocks (M>N=integer≧2) having different addresses are recorded continuously in a scanning direction of effective blocks, the information reproduction speed of the information reproduction apparatus at which a code corresponding to the K pairs of N blocks, can be increased by making the respective values of N, M and K larger.

The continuous N blocks need not be always formed all over the dot code.

A fifth embodiment of the present invention will now be described.

In general, when a reading unit is scanned to read a dot code, the scanning speed increases gradually from the beginning of scanning, decreases toward the end of scanning, and reaches its maximum halfway therebetween.

This scanning is graphed in FIGS. 9A and 9B. In FIG. 9A, the abscissa indicates time elapsed from the start of scanning and the ordinate does a scanning position from the left end of a dot code. In FIG. 9B, the abscissa shows time elapsed from the start of scanning and the ordinate does a scanning speed.

If the overlapped blocks are increased in number toward a halfway portion of the dot code, the scanning speed can be increased and the recording area can be decreased, with the result that the dot code is highly efficient.

An example of the dot code is illustrated in FIG. 10. In this dot code, the number of overlapped blocks is increased gradually toward the halfway portion of the dot code, that is, there is no overlap in the blocks of addresses 1 to 8 and 17 to 20, but there is double overlap in those of addresses 9 to 16 which are located halfway through the dot code.

Not only when the reading unit 20 is scanned manually, but also when a reading unit of a card on which a dot pattern code is recorded, such as a card reader, is scanned by mechanical driving, the scanning speed is slow at the beginning and the end of scanning in most cases. The present invention is favorably applied to such a mechanical scan type scanner.

Consequently, the fifth embodiment of the present invention is directed to an information recording medium wherein the overlapped blocks are increased in number toward the halfway portion of the dot code. The information recording medium can thus be scanned at high speed and its recording area can be reduced, thus making the dot code highly efficient.

A sixth embodiment of the present invention will now be described.

In general, when a dot pattern code can be scanned without paying any attention, for example, when a card on which a dot pattern code is recorded is manually scanned while being pushed on a guide provided at a reading portion of a reading unit, the scanning can be performed at higher speed than in the above case where the reading section 20 is scanned. In the sixth embodiment, there are many cases where the scanning speed increases gradually from the beginning of scanning and reaches its maximum at the end of scanning.

This scanning is graphed in FIGS. 11A and 11B. In FIG. 11A, the abscissa indicates time elapsed from the start of scanning and the ordinate does a scanning position from the left end of a dot code. In FIG. 11B, the abscissa shows time elapsed from the start of scanning and the ordinate does a scanning speed.

In the sixth embodiment, a dot code, which is formed of overlapped blocks gradually increasing in number, is prepared as shown in FIG. 12. In this dot code, there is no overlap in blocks of addresses 1 to 8, but there is double overlap in those of addresses 9 to 12 and quadruple overlap in those of addresses 13 to 16. The number of overlaps increases as the number of block addresses does. In scanning a card on which the dot code is recorded, even if the scanning is started from the block whose address number is the smallest (from the left-hand side of FIG. 12) and its speed is increased gradually, all the blocks can be scanned and thus information can reliably be reproduced, since the number of overlaps increases as the address number becomes larger (on the right-hand side of FIG. 12).

The foregoing dot code of the sixth embodiment is suitable for a manual card reader. Since the sixth embodiment is directed to a recording medium wherein the overlap of blocks increases in number toward the end of scanning, the scanning speed can be increased and the recording area can be reduced, thus making the dot code efficient.

Finally a seventh embodiment of the present invention will be described.

There is a card such as an ID card of an operator serving as an application for recording a dot pattern code on a card. Normally, a registration number is registered on the ID card as ID information (for identifying the operator). When the ID information is recorded on the dot pattern code, operator's information such as a registration number, sign, name, date of birth, photo of face, and voice is recorded as a dot pattern code. To identify the operator as himself or herself, it is thought that the recorded dot pattern code is scanned to reproduce all the information.

If, therefore, a dot pattern code is formed so as to have a block arrangement as shown in FIG. 13, a registration number can be reproduced even if it is scanned at high speed, and all the information can be reproduced if it is scanned slowly.

In FIG. 13, the registration number is recorded in the blocks of addresses 1 to 6 and the number of overlaps of the blocks is three, while the other information is recorded in the blocks of addresses 7 to 34 and these blocks are not overlapped. The registration number is recorded in one row of blocks (along the scanning direction), and the other information is recorded in the remaining two rows.

If the above card on which a dot pattern code is recorded is scanned at a higher speed than a predetermined one at the time of identification, none of the information can be reproduced, but the registration number, which is considered to be the most important, is reproduced to identify an operator as himself or herself. If the card is scanned slowly again, all the information is reproduced and thus the operator can be identified more reliably.

As described above, the number of overlaps varies from information to information, and the more important the information, the larger the number of overlaps. Therefore, desired information can reliably be reproduced even though high-speed scanning is performed. In the seventh embodiment, since the number of overlaps varies from information to information and the dot pattern code is recorded on the card so as to fall within a range of the length of the card, a plurality of rows of blocks are prepared (along the scanning direction) for their respective information items such that a number of overlaps can be provided for the information of the registration number the amount of which is small.

However, the information items need not be always divided completely for the respective rows. The number of overlaps for desired information which is to be reproduced at high speed, is increased in accordance with the high speed, and the desired information is recorded in a predetermined row, while the other information can be done in the other rows as well as the predetermined row.

More specifically, there is an information recording medium on which different information items are recorded with different numbers of overlaps, and a desired information item can reliably be reproduced even by scanning at high speed. There is another information recording medium on which different information items are recorded for their respective rows, and a desired information item can reliably be reproduced even by scanning at high speed, too.

The number of overlaps set in the scanning direction in accordance with the scanning speed or moving speed, can be varied from information to information, as described above with reference to FIGS. 10 and 12.

The present invention is not limited to the foregoing first to seventh embodiments, but various changes and modifications can be made without departing from the scope of the subject matter of the present invention. The subject matter is summarized as follows:

(1) An information recording medium comprising:
   a sheet-shaped medium; and
   a dot pattern recorded on at least one surface of the sheet-shaped medium and optically readable, the dot pattern including a block group having a plurality of blocks arranged in matrix, and each of the blocks having both a data dot pattern formed of a plurality of dots arranged in accordance with the content of data and a block address pattern arranged in a predetermined position in relation to the data dot pattern and representing an address of the block of the block group,
   wherein the dot pattern includes the same blocks overlapped in a scanning direction.

Recorded data can reliably be reproduced even by high-speed scanning.

(2) The information recording medium according to (1), wherein the dot pattern includes the same blocks recorded continuously.

Recorded data can reliably be reproduced even by high-speed scanning.

(3) The information recording medium according to (1), wherein the dot pattern includes pairs of the same blocks recorded continuously.

Recorded data can reliably be reproduced even by high-speed scanning.

(4) The information recording medium according to (1), wherein the dot pattern includes the same blocks recorded periodically.

Recorded data can reliably be reproduced even by scanning at high speed.

(5) The information recording medium according to (1), wherein the dot pattern includes the same blocks overlapped in a direction perpendicular to the scanning direction.

Recorded data can reliably be reproduced even though the dot pattern is scanned quickly or swingingly in the direction perpendicular to the scanning direction.

(6) The information recording medium according to any one of (1) to (4), wherein the dot pattern is reproduced from a plurality of images picked up by an image pickup unit of an information reproduction apparatus; the image pickup unit has an image pickup range capable of picking up images of M blocks at most in the scanning direction and picking up images of at least (M−1) blocks, where M is an integer larger than 2; and K pairs of blocks each including N different blocks arranged continuously in the scanning direction are recorded in the scanning direction, where N is an integer smaller than M and equal to or larger than 2, and K is an integer equal to or larger than 2.

Recorded data can reliably be reproduced even by high-speed scanning.

(7) The information recording medium according to any one of (1) to (4), wherein the dot pattern includes the same blocks overlapped with the overlaps of the same blocks increasing in number toward a halfway portion of the dot pattern in the scanning direction.

Recorded data can reliably be reproduced and recording density can be enhanced by increasing the scanning speed toward the halfway portion of the dot pattern.

(8) The information recording medium according to any one of (1) to (4) and (7), wherein the dot pattern includes a plurality of rows of the same blocks overlapped in the scanning direction with the overlaps of the same blocks varying in number from row to row.

The capability of reproduction can be varied in accordance with the scanning speeds of different information items recorded for the respective rows, and the recording density can be enhanced. In other words, recorded data can reliably be reproduced even though the scanning speed becomes higher as information increases in importance.

(9) The information recording medium according to any one of (1) to (4), wherein the dot pattern includes blocks overlapped, the number of overlaps of the blocks being determined in accordance with a scanning speed at which a reading unit scans the dot pattern.

Recorded data can reliably be reproduced even by high-speed scanning.

(10) The information recording medium according to (9), wherein the scanning speed becomes higher as the number of overlaps increases.

Recorded data can reliably be reproduced even by high-speed scanning.

(11) The information recording medium according to (10), wherein the number of overlaps increases toward a halfway portion of the dot pattern.

Recorded data can reliably be reproduced and recording density can be increased by increasing the scanning speed toward the halfway portion of the dot pattern, particularly using a mechanical scan type card reader.

(12) The information recording medium according to (10), wherein the number of overlaps increases toward the end of the dot pattern.

Recorded data can reliably be reproduced and recording density can be increased by increasing the scanning speed toward the end portion of the dot pattern, particularly using a manual scan type card reader.

(13) The information recording medium according to any one of (1) to (4), wherein the dot pattern includes blocks whose arrangement varies from data to data.

The priority is determined for each of the information items, and the reproducible speed is varied in accordance with the scanning speed of each of the information items. Thus, an information item reliably reproduced and another information item reproduced by slow scanning can be distinguished from each other, and the recording density can be increased.

(14) The information recording medium according to any one of (1) to (4), wherein the dot pattern includes blocks whose overlaps vary in number from data to data.

The priority is determined for each of the information items, and the reproducible speed is varied in accordance with the scanning speed of each of the information items. Thus, an information item reliably reproduced and another information item reproduced by slow scanning can be distinguished from each other, and the recording density can be increased.

(15) The information recording medium according to any one of (1) to (5), wherein the dot pattern includes blocks overlapped, the number of overlaps of blocks being determined in accordance with a scanning amount by which a reading unit scans the dot pattern.

Recorded data can thus be reproduced with reliability even though the scanning amount is large.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An information recording medium comprising:
   a sheet-shaped medium; and
   a dot pattern recorded on at least one surface of said sheet-shaped medium and optically readable, said dot pattern including a block group having a plurality of blocks arranged in matrix, and each of the blocks having both a data dot pattern formed of a plurality of dots arranged in accordance with a content of data and a block address pattern arranged in a predetermined position in relation to the data dot pattern and representing an address of said each of the blocks of the block group,
   wherein said dot pattern includes same blocks overlapped in a scanning direction.

2. The information recording medium according to claim 1, wherein said dot pattern includes same blocks recorded continuously.

3. The information recording medium according to claim 2, wherein said dot pattern is reproduced from a plurality of images picked up by an image pickup unit of an information reproduction apparatus; said image pickup unit has an image pickup range capable of picking up images of at most M blocks in the scanning direction and picking up images of at least (M−1) blocks, where M is an integer larger than 2; and K pairs of blocks each including N different blocks arranged continuously in the scanning direction are recorded in the scanning direction, where N is an integer smaller than M and equal to or larger than 2, and K is an integer equal to or larger than 2.

4. The information recording medium according to claim 2, wherein said dot pattern includes a plurality of rows of same blocks overlapped in the scanning direction with overlaps of the same blocks varying in number from row to row.

5. The information recording medium according to claim 2, wherein said dot pattern includes blocks overlapped, the number of overlaps of blocks being determined in accordance with a scanning speed at which a reading unit scans the dot pattern.

6. The information recording medium according to claim 5, wherein said scanning speed becomes higher as the number of overlaps of blocks increases.

7. The information recording medium according to claim 2, wherein said dot pattern includes blocks whose arrangement varies from data to data.

8. The information recording medium according to claim 2, wherein said dot pattern includes blocks whose overlaps vary in number from data to data.

9. The information recording medium according to claim 2, wherein said dot pattern includes blocks overlapped, the number of overlaps of blocks being determined in accordance with a scanning amount by which a reading unit scans the dot pattern.

10. The information recording medium according to claim 1, wherein said dot pattern includes pairs of same blocks recorded continuously.

11. The information recording medium according to claim 10, wherein said dot pattern is reproduced from a plurality of images picked up by an image pickup unit of an information reproduction apparatus; said image pickup unit has an image pickup range capable of picking up images of at most M blocks in the scanning direction and picking up images of at least (M−1) blocks, where M is an integer larger than 2; and K pairs of blocks each including N different blocks arranged continuously in the scanning direction are recorded in the scanning direction, where N is an integer smaller than M and equal to or larger than 2, and K is an integer equal to or larger than 2.

12. The information recording medium according to claim 10, wherein said dot pattern includes a plurality of rows of same blocks overlapped in the scanning direction with overlaps of the same blocks varying in number from row to row.

13. The information recording medium according to claim 10, wherein said dot pattern includes blocks overlapped, the number of overlaps of blocks being determined in accordance with a scanning speed at which a reading unit scans the dot pattern.

14. The information recording medium according to claim 13, wherein said scanning speed becomes higher as the number of overlaps of blocks increases.

15. The information recording medium according to claim 10, wherein said dot pattern includes blocks whose arrangement varies from data to data.

16. The information recording medium according to claim 10, wherein said dot pattern includes blocks whose overlaps vary in number from data to data.

17. The information recording medium according to claim 10, wherein said dot pattern includes blocks overlapped, the number of overlaps of blocks being determined in accordance with a scanning amount by which a reading unit scans the dot pattern.

18. The information recording medium according to claim 1, wherein said dot pattern includes same blocks recorded periodically.

19. The information recording medium according to claim 18, wherein said dot pattern is reproduced from a plurality of images picked up by an image pickup unit of an information reproduction apparatus; said image pickup unit has an image pickup range capable of picking up images of at most M blocks in the scanning direction and picking up images of at least (M−1) blocks, where M is an integer larger than 2; and K pairs of blocks each including N different blocks arranged continuously in the scanning direction are recorded in the scanning direction, where N is an integer smaller than M and equal to or larger than 2, and K is an integer equal to or larger than 2.

20. The information recording medium according to claim 18, wherein said dot pattern includes a plurality of rows of same blocks overlapped in the scanning direction with overlaps of the same blocks varying in number from row to row.

21. The information recording medium according to claim 18, wherein said dot pattern includes blocks overlapped, the number of overlaps of blocks being determined in accordance with a scanning speed at which a reading unit scans the dot pattern.

22. The information recording medium according to claim 21, wherein said scanning speed becomes higher as the number of overlaps of blocks increases.

23. The information recording medium according to claim 18, wherein said dot pattern includes blocks whose arrangement varies from data to data.

24. The information recording medium according to claim 18, wherein said dot pattern includes blocks whose overlaps vary in number from data to data.

25. The information recording medium according to claim 18, wherein said dot pattern includes blocks overlapped, the number of overlaps of blocks being determined in accordance with a scanning amount by which a reading unit scans the dot pattern.

26. The information recording medium according to claim 1, wherein said dot pattern includes same blocks overlapped in a direction perpendicular to the scanning direction.

27. The information recording medium according to claim 26, wherein said dot pattern includes blocks overlapped, the number of overlaps of blocks being determined in accordance with a scanning amount by which a reading unit scans the dot pattern.

28. The information recording medium according to claim 1, wherein said dot pattern is reproduced from a plurality of images picked up by an image pickup unit of an information reproduction apparatus; said image pickup unit has an image pickup range capable of picking up images of at most M blocks in the scanning direction and picking up images of at least (M−1) blocks, where M is an integer larger than 2; and K pairs of blocks each including N different blocks arranged continuously in the scanning direction are recorded in the scanning direction, where N is an integer smaller than M and equal to or larger than 2, and K is an integer equal to or larger than 2.

29. The information recording medium according to claim 1, wherein said dot pattern includes same blocks overlapped with overlaps of the same blocks increasing in number toward a halfway portion of the dot pattern in the scanning direction.

30. The information recording medium according to claim 1, wherein said dot pattern includes a plurality of rows of same blocks overlapped in the scanning direction with overlaps of the same blocks varying in number from row to row.

31. The information recording medium according to claim 1, wherein said dot pattern includes blocks overlapped, the number of overlaps of blocks being determined in accordance with a scanning speed at which a reading unit scans the dot pattern.

32. The information recording medium according to claim 31, wherein said scanning speed becomes higher as the number of overlaps of blocks increases.

33. The information recording medium according to claim 1, wherein said dot pattern includes blocks whose arrangement varies from data to data.

34. The information recording medium according to claim 1, wherein said dot pattern includes blocks whose overlaps vary in number from data to data.

35. The information recording medium according to claim 1, wherein said dot pattern includes blocks overlapped, the number of overlaps of blocks being determined in accordance with a scanning amount by which a reading unit scans the dot pattern.

* * * * *